United States Patent
Doradla et al.

(10) Patent No.: US 7,634,294 B2
(45) Date of Patent: Dec. 15, 2009

(54) METHOD AND APPARATUS FOR EXCHANGING CONTENT OVER DISTINCT WIRELESS ACCESS TECHNOLOGIES

(75) Inventors: Anil Doradla, Austin, TX (US); Sreenivasa Gorti, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 323 days.

(21) Appl. No.: 11/380,151

(22) Filed: Apr. 25, 2006

(65) Prior Publication Data

US 2007/0249387 A1    Oct. 25, 2007

(51) Int. Cl.
    H04M 1/00    (2006.01)
(52) U.S. Cl. .................... 455/552.1; 455/553.1
(58) Field of Classification Search .... 455/552.1–553.1
    See application file for complete search history.

(56) References Cited

U.S. PATENT DOCUMENTS

| | | | |
|---|---|---|---|
| 7,284,046 B1 * | 10/2007 | Kreiner et al. | 709/223 |
| 2002/0154361 A1 * | 10/2002 | Pesach et al. | 359/139 |
| 2003/0204394 A1 * | 10/2003 | Garudadri et al. | 704/201 |
| 2003/0206535 A1 | 11/2003 | Shpak | |
| 2004/0013416 A1 * | 1/2004 | Mok | 386/125 |
| 2004/0027999 A1 | 2/2004 | Casaccia et al. | |
| 2004/0203965 A1 * | 10/2004 | Robinson | 455/502 |
| 2005/0147068 A1 | 7/2005 | Rajkotia | |
| 2006/0072542 A1 * | 4/2006 | Sinnreich et al. | 370/351 |
| 2006/0135120 A1 * | 6/2006 | Likourezos | 455/406 |
| 2006/0215620 A1 * | 9/2006 | Ou et al. | 370/338 |
| 2006/0259601 A1 * | 11/2006 | Soelberg et al. | 709/223 |
| 2007/0123267 A1 * | 5/2007 | Whinnett et al. | 455/452.2 |
| 2007/0129082 A1 * | 6/2007 | Thacher | 455/456.1 |
| 2007/0185774 A1 * | 8/2007 | Schreiber et al. | 705/26 |

FOREIGN PATENT DOCUMENTS

WO    WO 03073198    9/2003

* cited by examiner

*Primary Examiner*—Nick Corsaro
*Assistant Examiner*—Amanuel Lebassi
(74) *Attorney, Agent, or Firm*—Ed Guntin; Pablo Meles; Akerman Senterfitt

(57) ABSTRACT

An apparatus and method are disclosed for exchanging content over distinct wireless access technologies. An apparatus that incorporates teachings of the present disclosure may include, for example, a multimode access network server (MANS) (102) having a controller that manages operations of a communications interface that communicates with multimode communication devices (MCDs) in a communication system. The controller can be programmed to receive from an MCD status information associated with a plurality of wireless access points (WAPs), each WAP operating according to a disparate wireless access technology, and determine with the MCD a coordination plan for transmitting partitioned content by way of at least two of the WAPs. Additional embodiments are disclosed.

21 Claims, 3 Drawing Sheets

METHOD AND APPARATUS FOR EXCHANGING CONTENT OVER DISTINCT WIRELESS ACCESS TECHNOLOGIES

FIELD OF THE DISCLOSURE

The present disclosure relates generally to wireless services, and more specifically to a method and apparatus for exchanging content over distinct wireless access technologies.

BACKGROUND

The evolution of wireless communications continues to give rise to new wireless access technologies such as WiMAX, ultra wide band (UWB), and software defined radio (SDR). These and existing wireless technologies such as cellular, WiFi, and Bluetooth, provide end users of multimode communication devices an expansive set of services to choose from a number of service providers.

A need therefore arises for a method and apparatus to exchange content over distinct wireless access technologies.

DETAILED DESCRIPTION

Embodiments in accordance with the present disclosure provide a method for exchanging content over distinct wireless access technologies.

In a first embodiment of the present disclosure, a multimode access network server (MANS) can have a controller that manages operations of a communications interface that communicates with multimode communication devices (MCDs) in a communication system. The controller can be programmed to receive from an MCD status information associated with a plurality of wireless access points (WAPs), each WAP operating according to a disparate wireless access technology, and determine with the MCD a coordination plan for transmitting partitioned content by way of at least two of the WAPs.

In a second embodiment of the present disclosure, a multimode communication device (MCD) can have a controller that manages operations of a wireless transceiver that communicates with wireless access points (WAPs) and a multimode access network server (MANS) in a communication system. The controller can be programmed to monitor communication parameters associated with a plurality of WAPs, each WAP operating according to a dissimilar wireless access technology, transmit to the MANS the communication parameters, and coordinate with the MANS a coordination plan for transmitting partitioned content by way of at least two of the WAPs.

In a third embodiment of the present disclosure, a multimode communication device (MCD) can have a controller that manages operations of a wireless transceiver that communicates with wireless access points (WAPs) and other MCDs in a communication system. The controller can be programmed to monitor communication parameters associated with a plurality of WAPs, each WAP operating according to a distinct wireless access technology, transmit to another MCD the communication parameters, and transmit to the other MCD a strategy for transmitting content partitioned among at least two of the WAPs.

In a fourth embodiment of the present disclosure, a computer-readable storage medium in a multimode access network server (MANS), comprising computer instructions for determining with a multimode communication device (MCD) a coordination plan for partitioning content over two or more wireless access points (WAPs).

In a fifth embodiment of the present disclosure, a computer-readable storage medium in a multimode communication device (MCD), comprising computer instructions for communicating to a computing device a coordination plan for partitioning content over two or more wireless access points (WAPs).

Figure 1:
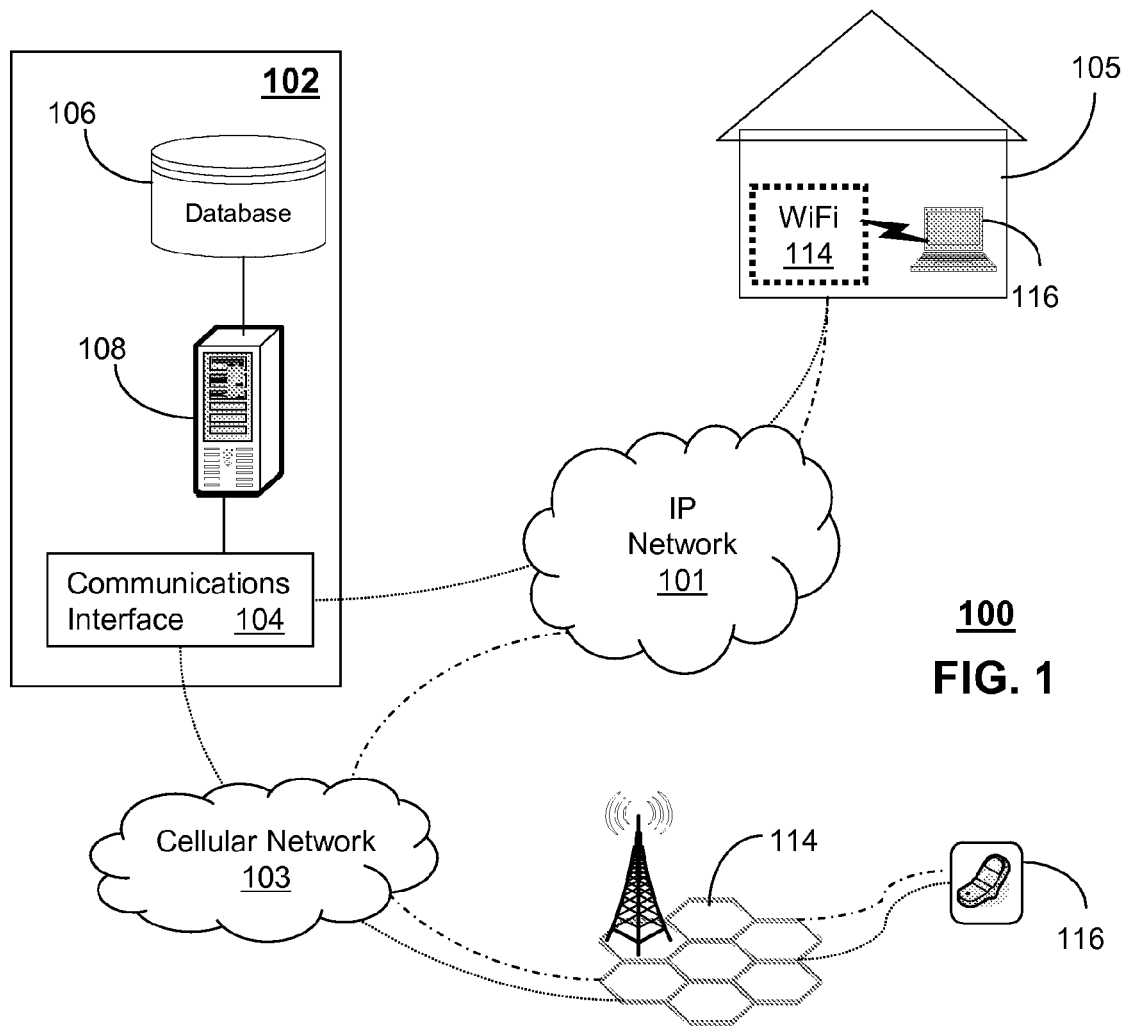
FIG. 1 depicts an exemplary embodiment of multimode communication devices (MCDs) communicating by way of wireless access points (WAPs) with other MCDs and/or a multimode access network server (MANS), which collectively operate as a communication system.

FIG. 1 depicts an exemplary embodiment of multimode communication devices (MCDs) 116 communicating by way of wireless access points (WAPs) 114 with other MCDs and/or a multimode access network server (MANS), which collectively operate as a communication system 100. The MCD 116 can represent any common computing device (e.g., a cellular phone or laptop) capable of communicating wirelessly with more than one WAP 114 in the communication system 100 operating according to distinct wireless access technologies.

The WAPs 114 of FIG. 1 depict a number of possible embodiments including a plurality of cellular base stations supporting wireless voice and/or data communications in a cellular network 103, and/or one or more Wireless Fidelity (WiFi) access points operating in a commercial enterprise or residence 105. The cellular network 103 can utilize circuit-switched technology that supports voice and data services such as GSM-GPRS, EDGE, CDMA-1X, EV/DO, UMTS, and other known and next generation cellular communications technologies.

The cellular network 103 utilizes a frequency-reuse architecture for communicating over-the-air with roaming MCDs 116 over an expansive area. The WiFi access points can conform to any one of IEEE's 802.11 present and next generation protocols (e.g., IEEE 802.11 a, b, g, n and/or next generation technologies) and can operate individually or in a mesh network.

Alternatively, or in combination, other wireless access technologies can be applied to the present disclosure such as, for example, a Worldwide Interoperability for Microwave Access (WiMAX), ultra wide band (UWB), Bluetooth™, and software defined radio (SDR). SDR provides a means to access public and private communication spectrum with any number of communication protocols that can be dynamically downloaded over-the-air to the MCD 116. Other present and future generation wireless access technologies can also be used in the present disclosure.

The communication system 100 can further comprise an IP (Internet Protocol) network 101 that couples the MANS 102 to the MCDs 116 for carrying Internet traffic therebetween. The MANS 102 comprises a communications interface 104 that utilizes common technology for communicating over an IP interface with the IP network 101, and the cellular network 103. By way of these interfaces, the MANS 102 can coordinate with the MCDs 116 the transmission of partitioned content over several WAPs 114 as will be discussed below. The MANS 102 can utilize a memory 106 (such as a high capacity storage medium) embodied in this illustration as a database, and a controller 108 having computing technology such as a desktop computer, or scalable server for controlling operations of the MANS 102.

Figure 2:
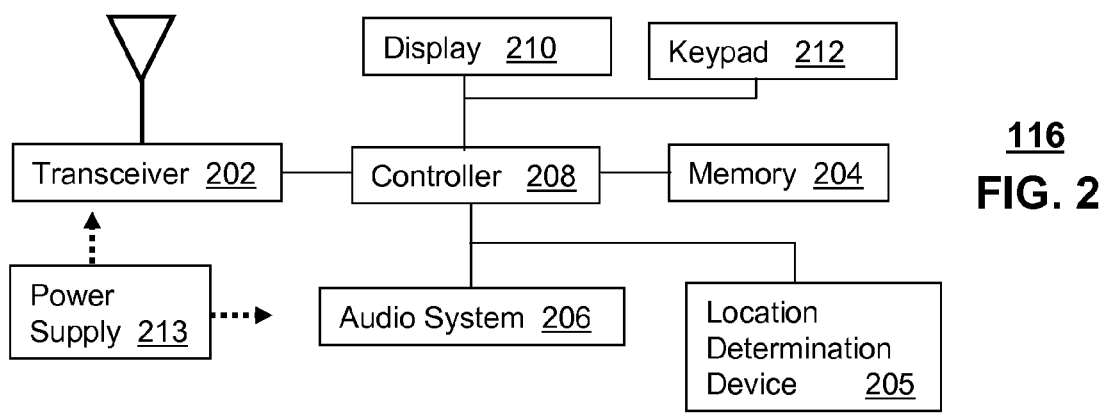
FIG. 2 depicts an exemplary embodiment of the MCD.

FIG. 2 is an exemplary block diagram of the MCD 116. The MCD 116 can include short range communications technology in a wireless transceiver 202 such as used by cordless phones, or by way of Bluetooth or WiFi to support mobility within a small area such as the end user's residence or enterprise. The wireless transceiver 202 can further support mid to long-range wireless communications with the WAPs 114 by way of cellular, or WiMAX technologies. The MCD 116 preferably supports at least two distinct wireless access technologies to support mobility. For example, when the MCD 116 is within the premises of the building 105 it can function as a plain old telephone service (POTS) device, or a Voice over IP (VoIP) device over an IP network by way of a POTS, WiFi, or Bluetooth™ interface. When roaming outside the building 105, the MCD communicates over the cellular network 103 or other long-range networks such as WiMAX.

Each of the foregoing embodiments for the MCDs 116 can utilize a memory 204, an audio system 206, and a controller 208 among other possible functional components. The memory 204 can comprise storage devices such as RAM, SRAM, DRAM, and/or Flash memories. The memory 204 can be external or an integral component of the controller 208. The audio system 206 can be utilized for exchanging audible signals with an end user. The MCD 116 can further include a location determination device 205 such as a common global positioning system (GPS) receiver for determining a location of the MCD, a display 210 for conveying images to the end user, a keypad 212 for manipulating operations of the MCD 116, and a portable power supply 213. The audio system 206, the display 210, and the keypad 212 can singly or in combination represent a user interface (UI) for controlling operations of the MCD 116 as directed by the end user. The controller 208 can manage the foregoing components with computing technology such as a microprocessor and/or digital signal processor.

Figure 3:
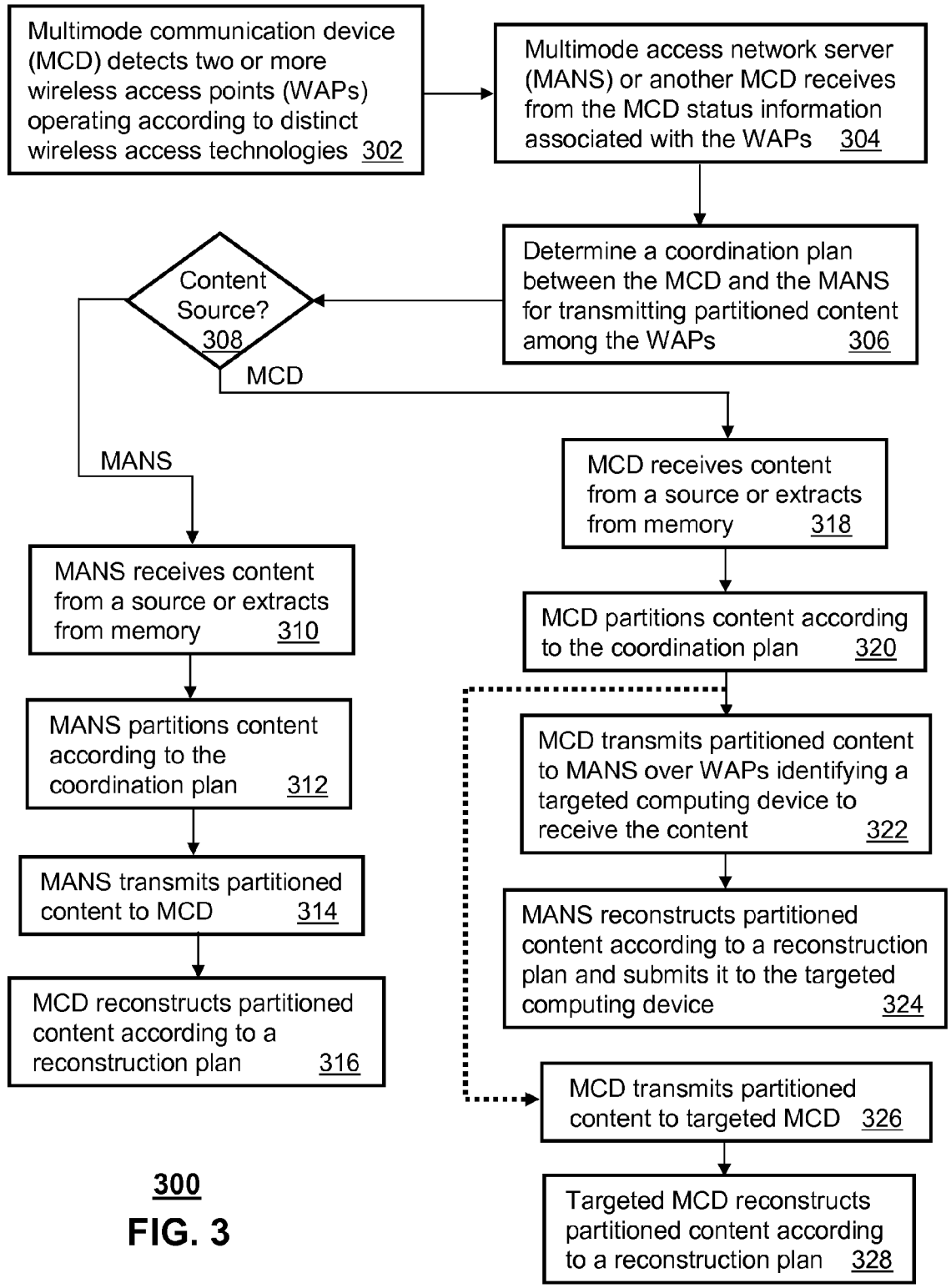
FIG. 3 depicts an exemplary method operating in portions of the MANS, the MCDs.

FIG. 3 depicts an exemplary method 300 operating in portions of the MANS 102, and the MCDs 116. Method 300 begins with step 302 in which an MCD 116 detects two or more WAPS operating with different wireless access technologies. For example, the MCD 116 may be in the building 105 in which it detects a WiFi access point, and continues to have reception to the cellular network 103. Alternatively, the MCD 116 can detect more than one cellular network operated by independent service providers. For example, depending on the access technologies supported by the MCD 116, it can be programmed to detect multiple GSM networks operated independently, a CDMA network and a GSM network, a GSM network and a WiMAX network, a WiMAX network and SDR public and private spectrum, and numerous other combinations.

Once detected, the MCD 116 can be programmed in step 304 to transmit to the MANS 102 (or another MCD 116 roaming in the communication system 100) status information associated with the WAPs 114 detected. The periodicity for transmitting the status information can be defined by the MCD 116, the MANS 102, or by way of a joint plan defined by the MCD and MANS. A higher frequency for transmitting the status information may be chosen under circumstances in which the activities of the monitored WAPs 114 is changing rapidly. For example, suppose the MCD 116 is in a location that borders multiple WAP cells. The MCD 116 under these circumstances may detect changes in signal strength from bordering WAPs that it has detected. Under these conditions, the MCD 116 can be programmed to transmit status information relating to the WAP 114 more frequently than another WAP in which communications is detected to be stable.

The status information can include among other things a bit error rate (BER), a signal to noise ratio (SNR), a symbol error rate, a frame error rate, a packet loss rate, a transmission delay, a signal strength indication (e.g., RSSI—receive signal strength indicator), a speed of data transmission, and a speed of data reception. With these communication parameters, the MCD 116 and/or the MANS 102 (or another MCD 116) can make an informed decision in step 306 that leads to the formation of a coordination plan for partitioning content among the WAPs 114. The coordination plan can take into consideration any aspect of the aforementioned communication parameters and other factors such as cost of services for each of the WAPs 114, a time to transmit the partitioned content over each WAP to a targeted destination, one or more preferences for selecting WAPs supplied by an end user of the MCD 116, one or more preferences for selecting WAPs supplied by an end user of the MANS 102, or whether the end user of the MCD is roaming or in a home network. In yet another embodiment, the MANS 102 can receive location information from the MCD 116 for selecting the WAPs 114. In this embodiment the end user of the MCD 116 may have a preference for example to select a particular WAP 114 (e.g., a WiFi Access Point in the end user's residence or office) according to the end user's location independent of the availability of other WAPs in the vicinity of the end user.

Any number of preferences can be established for selecting WAPs 114 from a web portable. The aforementioned preferences, and other preferences such as a time of day for selecting WAPs, selecting WAPs according to a content type, selecting WAPs according to a content source, or selecting WAPs according to one or more communication features of the MCD 116 can be established by the end user of the MCD 116 or MANS 102 by way of a web portable. With such preferences, the end user can define a desired use of WAPs 114 according to content types (e.g., secure content versus public content), content sources (e.g., business content versus personal content), or according to the communication capabilities/limitations of the MCD 116. Moreover, the end user can specify a time profile for selecting WAPs 114 (e.g., certain WAPs for weekdays versus other WAPs for weekends).

From the aforementioned embodiments, it would be evident to an artisan with ordinary skill in the art that the MCD 116 and the MANS 102 can singly or in combination utilize any coordination model for determining the coordination plan.

Once a coordination plan has been determined, the MANS 102 or the MCD 116 can proceed to partition content depending on which of the two intends to originate the content in question. If the MANS 102 is the originator, it proceeds from step 308 to step 310; otherwise, the MCD 116 proceeds to step 318. In the case where the MANS 102 is the source of content, the MANS 102 receives the content from a source (e.g., a content portal identified by the MCD 116) or extracts it from its memory in step 310. In steps 312-314, the MANS 102 partitions the content according to the coordination plan and transmits the partitions to the MCD 116 by way of the WAPs 114 identified in said plan. The partitions can be asymmetric for each of the designated WAPs 114. That is, a larger portion of the content can be submitted to one WAP 114 versus another depending on any of the previously mentioned factors such as transmission speed, cost of service, and so on.

Additionally, the coordination plan can identify any partitioning format (e.g., frames, cells, packets, etc.) as well as apply any known or proprietary partitioning method.

In step 316, the MCD 116 receives the partitions from each of the WAPs 114, and reconstructs the content according to a reconstruction plan or strategy defined in the coordination plan. The reconstruction plan can, for example, identify the expected order of the partitions and a scheme for reconstruction. If the content transmitted is confidential, the MANS 102 can utilize interleaving and/or encryption methods to prevent unwarranted access to the content. The reconstruction scheme identified in the reconstruction plan allows the MCD 116 to deinterleave and/or decrypt the partitions and thereby construct the content in its original form.

In situations where the MCD 116 is the originator of the content, the MCD 116 proceeds to step 318 where it receives the content from a source or extracts it from its memory. The source as before can be of any kind (e.g., content from a web portal). In steps 320-322, the MCD 116 partitions content according to the coordination plan and transmits the partitions to the MANS 102. The MANS 102 in turn reconstructs the partitioned content according to a reconstruction plan or strategy defined in the coordination plan and transmits the reconstructed content to a targeted computing device which can be another MCD 116, or a single-mode communication device 116 incapable of receiving content over multiple wireless access technologies (e.g., a GSM-only cell phone).

Alternatively, the MCD 116 can proceed from step 320 to step 326 where it transmits the partitioned content to a targeted MCD 116 capable of receiving the partitions over the WAPs 114 identified in the coordination plan. The targeted MCD 116 in turn reconstructs the partitioned content in step 328 according to the reconstruction plan or strategy defined by the coordination plan. The reconstructed content can thereafter be used by the targeted MCD 116 as directed by its end user.

The content mentioned in the previous embodiments can be of any format. For example, the content can represent a multimedia file (JPEG, MPEG 3 or 4, WAV, GIF, etc.). Alternatively, the content can be live communications over VoIP, streaming audio or video assuming the speed of transmission over the alternate WAPs 114 selected and the time required to reconstruct the partitions is suitable for such applications.

Method 300 describes a number of embodiments in which partitioned communications can take place over disparate wireless access technologies in a number of combinations: MANS 102 to MCD 116, MCD 116 to MANS 102 to targeted MCD 116, and MCD 116 to MCD 116. It would be evident to an artisan with ordinary skill in the art that these embodiments can be modified, reduced, or enhanced without departing from the scope and spirit of the claims described below. The reader is therefore directed to the claims for a fuller understanding of the breadth and scope of the present disclosure.

Figure 4:
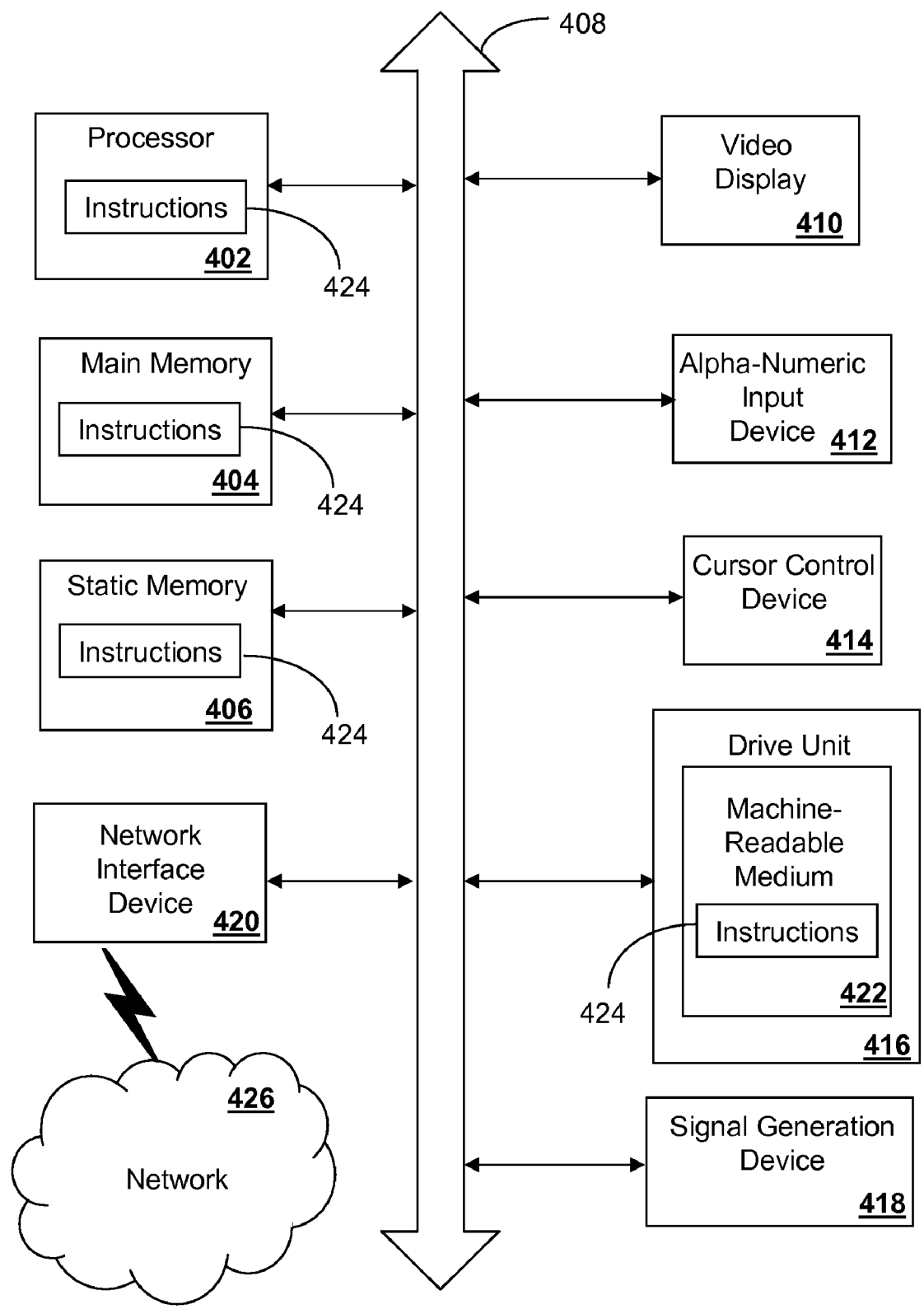
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" shall be taken to include a single medium or multiple media (e.g., a centralized or distributed database, and/or associated caches or servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, but excludes carrier wave signals such as a signal embodying computer instructions in an intangible transmission medium.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A multimode access network server (MANS), comprising:
   a controller that manages operations of a communications interface that communicates with multimode communication devices (MCDs) in a communication system, wherein the controller is programmed to:
   receive from an MCD status information associated with a plurality of wireless access points (WAPs), each WAP operating according to a disparate wireless access technology;
   receive from a web portal one or more preferences of selecting WAPs;
   determine with the MCD a coordination plan for transmitting partitioned content by way of at least two of the WAPs according to the one or more preferences for selecting WAPs;
   partition content according to the coordination plan; and
   transmit the partitioned content to the MCD by way of at least two of the WAPs selected according to the coordination plan, wherein the one or more preferences comprise at least one among a time of day for selecting WAPs, selecting WAPs according to a content type, selecting WAPs according to a content source, and selecting WAPs according to one or more communication features of the MCD.

2. The MANS of claim 1, wherein the controller is programmed to:
   receive the content from a source; partition the content according to the coordination plan; and transmit to the MCD the partitions of content by way of the at least two WAPs.

3. The MANS of claim 1, wherein the controller is programmed to:
   receive partitions of content from the at least two WAPs originated by the MCD; and
   reconstruct the content from the partitions according to a reconstruction plan.

4. The MANS of claim 3, wherein the controller is programmed to transmit the reconstructed content to a computing device as directed by the MCD.

5. The MANS of claim 1, wherein the status information for each of the WAPs comprises at least one among a signal to noise ratio, a symbol error rate, a frame error rate, a packet loss rate, a transmission delay, a signal strength indication, a speed of data transmission, and a speed of data reception, and wherein the WAPs operate according to one among a group of wireless access technologies comprising cellular, Bluetooth, wireless fidelity (WiFi), worldwide interoperability for microwave access (WiMAX), ultra wide band (UWB), and software defined radio (SDR).

6. The MANS of claim 1, wherein the controller is programmed to determine the coordination plan according to at least one among a cost for transmitting content over each WAP, a time to transmit the partitioned content over each WAP to a targeted destination, one or more preferences for selecting WAPs supplied by an end user of the MCD, one or more preferences for selecting WAPs supplied by an end user of the MANS, whether the end user of the MCD is roaming or in a home network, and one or more monitored conditions of each WAP for transmitting content wirelessly thereto.

7. The MANS of claim 1, wherein the controller is programmed to receive a location reading from the MCD, and determine the coordination plan there from.

8. The MANS of claim 1, wherein the status information received from the MCD has a transmission periodicity defined by one among the MANS, the MCD, and a joint plan defined between the MANS and the MCD.

9. A multimode communication device (MCD), comprising:
a controller that manages operations of a wireless transceiver that communicates with wireless access points (WAPs) and a multimode access network server (MANS) in a communication system, wherein the controller is programmed to:
monitor communication parameters associated with a plurality of WAPs, each WAP operating according to a dissimilar wireless access technology;
transmit to the MANS the communication parameters;
coordinate with the MANS a coordination plan for transmitting partitioned content by way of at least two of the WAPs according to one or more preferences for selecting WAPs, wherein said one or more preferences is supplied by a web portal;
partition content according to the coordination plan responsive a need to transmit said partitioned content to the MANS by way of at least two of the WAPs selected according to the coordination plan: and
reconstruct partitioned content according to the coordination plan responsive to receiving partitioned content from the MANS by way of at least two of the WAPs selected according to the coordination plan,
wherein the one or more preferences comprise at least one among a time of day for selecting WAPs, selecting WAPs according to a content type, selecting WAPs according to a content source, and selecting WAPs according to one or more communication features of the MCD.

10. The MCD of claim 9, wherein the controller is programmed to:
receive from each of the at least two WAPs content partitioned by the MANs; and
reconstruct the content from the partitions according to a strategy.

11. The MCD of claim 9, wherein the controller is programmed to:
partition the content according to the coordination plan; and transmit to the MANS the partitions of content by way of the at least two WAPs.

12. The MCD of claim 11, wherein the controller is programmed to receive the content from one among a source, and a memory managed by the controller.

13. The MCD of claim 11, wherein the controller is programmed to transmit to the MANS an identification of a computing device for which the content is directed.

14. The MCD of claim 9, wherein the status information for each of the WAPs comprises at least one among a symbol error rate, a frame error rate, a packet loss rate, a transmission delay, a signal strength indication, a speed of data transmission, and a speed of data reception.

15. The MCD of claim 9, comprising a location determination device, wherein the controller is programmed to:
determine a location of the MCD; and
supply the location to the MANs for determining the coordination plan.

16. A multimode communication device (MCD), comprising:
a controller that manages operations of a wireless transceiver that communicates with wireless access points (WAPs) and other MCDs in a communication system, wherein the controller is programmed to:
monitor communication parameters associated with a plurality of WAPs, each WAP operating according to a distinct wireless access technology;
transmit to another MCD the communication parameters;
communicate to the other MCD a coordination plan transmitting content partitioned among at least two of the WAPs that use disparate wireless access technologies;
receive from each of the at least two WAPs content partitioned by the other MCD; and
reconstruct the content from the partitions according to the strategy,
wherein the coordination plan operates according to one or more preferences for selecting WAPS, wherein the one or more preferences comprise at least one among a time of day for selecting WAPs, selecting WAPs according to a content type, selecting WAPs according to a content source, and selecting WAPs according to one or more communication features of at least one of the MCDs.

17. The MCD of claim 16, wherein the controller is programmed to:
partition the content according to the strategy; and transmit to the other MCD the partitions of content by way of the at least two WAPs.

18. The MCD of claim 17, wherein the controller is programmed to receive the content from one among a source, and a memory managed by the controller.

19. The MCD of claim 16, wherein the status information for each of the WAPs comprises at least one among a bit error rate (BER), a symbol error rate, a frame error rate, a packet loss rate, a transmission delay, a signal strength indication, a speed of data transmission, and a speed of data reception, wherein the WAPs operate according to one among a group of wireless access technologies comprising cellular, Bluetooth, wireless fidelity (WiFi), worldwide interoperability for microwave access (WiMAX), ultra wide band (UWB), and software defined radio (SDR), and wherein the controller is programmed to determine the strategy according to a usage cost for each of the WAPs, and a portion of the communication parameters.

20. A computer-readable storage medium in a multimode access network server (MANS), comprising computer instructions to:
receive from an MCD status information associated with a plurality of wireless access points (WAPs, each WAP operating according to a disparate wireless access technology;
receive from a web portal one or more preferences for selecting WAPs;
determine with the MCD a coordination plan for transmitting partitioned content by way of at least two of the WAPs according to the one or more preferences for selecting WAPs;
partition content according to the coordination plan; and
transmit the partitioned content to the MCD by way of at least two of the WAPs selected according to the coordination plan, wherein the one or more preferences comprise at least one among a time of day for selecting WAPs, selecting WAPs according to a content type, selecting WAPs according to a content source, and selecting WAPs according to one or more communication features of the MCD.

21. A computer-readable storage medium in a multimode communication device (MCD), comprising computer instructions to:
- monitor communication parameters associated with a plurality of WAPs, each WAP operating according to a dissimilar wireless access technology;
- transmit to the MANS the communication parameters;
- coordinate with the MANS a coordination plan for transmitting partitioned content by way of at least two of the WAPs according to one or more preferences for selecting WAPs, wherein said one or more preferences is supplied by a web portal;
- partition content according to the coordination plan responsive a need to transmit said partitioned content to the MANS by way of at least two of the WAPs selected according to the coordination plan; and
- reconstruct partitioned content according to the coordination plan responsive to receiving partitioned content from the MANS by way of at least two of the WAPs selected according to the coordination plan, wherein the one or more preferences comprise at least one among a time of day for selecting WAPs, selecting WAPs according to a content type, selecting WAPs according to a content source, and selecting WAPs according to one or more communication features of the MCD.

* * * * *